No. 651,656. Patented June 12, 1900.
F. DÜRR.
FRICTION GEARING.
(Application filed Apr. 17, 1900.)
(No Model.)
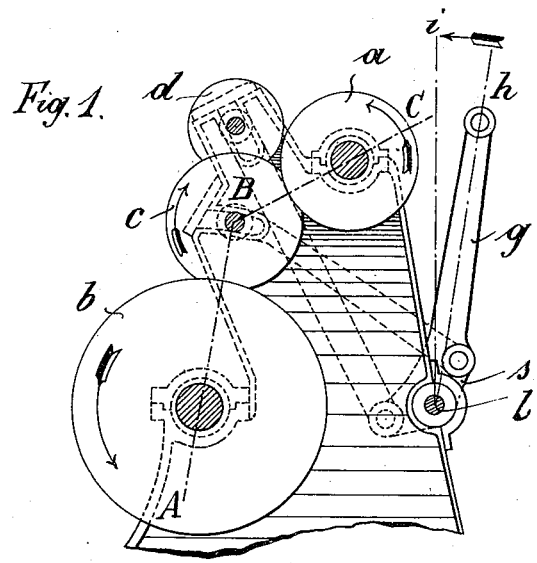
Fig. 1.
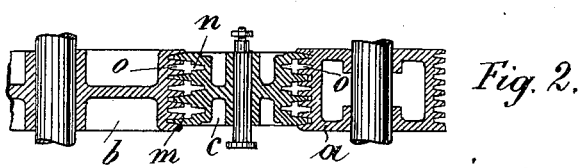
Fig. 2.
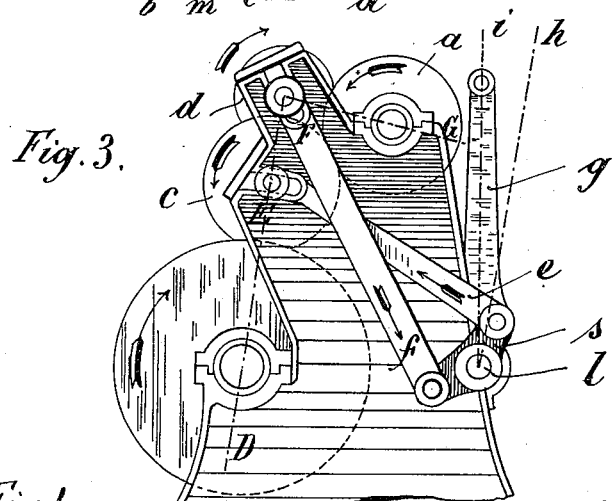
Fig. 3.
Fig. 4.
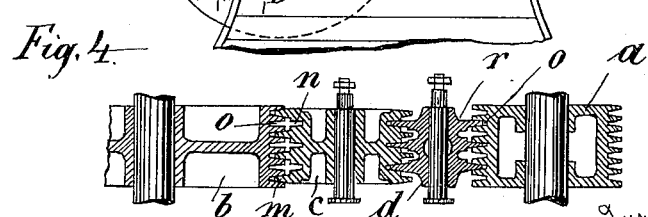
THE NORRIS PETERS CO., PHOTO-LITHO., WASHINGTON, D. C.

UNITED STATES PATENT OFFICE.

FRITZ DÜRR, OF BERLIN, GERMANY.

FRICTION-GEARING.

SPECIFICATION forming part of Letters Patent No. 651,656, dated June 12, 1900.

Application filed April 17, 1900. Serial No. 13,220. (No model.)

*To all whom it may concern:*

Be it known that I, FRITZ DÜRR, engineer, a subject of the Emperor of Germany, and a resident of Alt Moabit 97, Berlin, in the Kingdom of Prussia and Empire of Germany, have invented certain new and useful Improvements in Friction-Gearing, of which the following is a specification.

The object of my invention is to produce an improved friction-gearing wherein the direction of rotation of a driven shaft may be changed at will by the insertion or withdrawal of intermediate wheels.

My improvement comprises driving and driven wheels each having key-grooves, one or more intermediate wheels, each having series of key-grooves, and means whereby the intermediate wheel or wheels are supported so that the driving and driven wheels can be geared together directly or indirectly and at the same time a change in the relations of the gearing can be obtained.

In the subjoined drawings we have a sample of such a gearing.

Figure 1 shows the gearing in the front view, with insertion of an intermediate wheel, the front of the frame being taken off. Fig. 2 is a long section through Fig. 1 in the direction of A B C. Fig. 3 shows the position of the gearing where the two intermediate wheels are connected, whereas Fig. 4 represents a long section of Fig. 3 in the direction of D E F G.

The drawings are based on the supposition that $a$ is the driving-wheel and $b$ the driven one, whereas $c$ and $d$ are the two intermediate wheels. In the position of the wheels as per Figs. 1 and 2 the wheels $a$, $b$, and $c$ are at gear and their direction of rotation is indicated by the arrows. As may be seen by the drawings, the wheel $c$ may rest on the twin levers $e$ and the wheel $d$ on the twin levers $f$, whereas both couples of levers are linked to the double arm $s$, sitting on the shaft $l$. The shaft is connected to the lever $g$. Now if the lever $g$ is brought from the position $h$, Fig. 1, into the position $i$, Fig. 3, the wheel $c$ is disconnected from the wheel $a$ and the wheel $d$ connected to the two wheels $a$ and $c$, when all the wheels will follow the direction of rotation indicated by the arrows; but since in key-wheels a key-ring is always opposed to a key-groove, which must not only be the case with the two wheels $a$ and $c$, but also with $a$ and $d$ on one side and $d$ and $c$ on the other side, a special construction of the one intermediate wheel will be required, which is obtained by giving it a double series of key-grooves. In the present case the wheel $c$ has such a construction. Its key-rings $m$ are placed at such a distance from each other as to insure the necessary space for lodging between them two key-rings of the wheels $a$ and $b$. Furthermore between each couple of key-rings $m$ there is made lower down provision for a key-groove $n$, which is opposite to each one of the key-grooves $o$ of the wheels $a$ and $b$, resulting from this that when the wheel $d$ is connected its key-rings $r$ may gear to the key-grooves $n$ and $o$; but thereby the wheel $c$ gets two different working diameters. Hence not only the direction of rotation of the driven wheel $b$ but also its speed may be altered. In case of need some intermediate wheels more may be connected, especially for the purpose of being able to increase or to diminish the difference of speed.

In the style of execution represented by the drawings one of the intermediate wheels is provided with two series of key-grooves of different diameters; but of course they may be arranged the inverse way by providing the driving-wheel or the driven one, or both—say, in the present case, the wheels $a$ and $b$—with two series of key-grooves of different widths, in which case the intermediate wheels may be fitted with single key-grooves. It is possible, too, to give all the wheels in question more than two series of key-grooves should the number of intermediate wheels require such an increasing.

Having thus described my invention, the following is what I claim as new therein and desire to secure by Letters Patent:

1. A friction-wheel having key-rings, spaced apart to provide outer key-grooves, adapted to receive two key-rings of adjacent friction-wheels, and also having inner key-grooves located in the same plane as the said outer key-grooves and adapted to receive the key-rings of an intermediate friction-wheel.

2. A friction-gearing comprising a driving-wheel having key-rings, a driven wheel having key-rings, and an intermediate wheel having key-rings spaced apart to provide key-grooves to receive two key-rings of the driving-wheel and two key-rings of the driven wheel between them.

3. A friction-gearing comprising driving and driven wheels each having key-rings, and intermediate wheels each having key-rings spaced apart to provide key-grooves to receive two key-rings of an adjacent wheel between them, and each also having inner key-grooves located in the same plane as their outer key-grooves, and adapted to receive the key-rings of the adjacent intermediate wheel.

4. A friction-gearing comprising driving and driven wheels, each having key-rings, intermediate wheels each having key-rings spaced apart to provide key-grooves to receive two key-rings of an adjacent wheel between them, and each also having inner key-grooves located in the same plane as their outer key-grooves and adapted to receive the key-rings of the adjacent intermediate wheel, a shaft having a double arm and lever, and the twin levers connected with the double arm and carrying the intermediate wheels.

In witness whereof I have hereunto set my hand in presence of two witnesses.

FRITZ DÜRR.

Witnesses:
 WOLDEMAR HAUPT,
 HENRY HASPER.